United States Patent
Le et al.

(10) Patent No.: US 7,490,226 B2
(45) Date of Patent: Feb. 10, 2009

(54) METHOD USING VECTOR COMPONENT COMPRISING FIRST AND SECOND BITS TO REGULATE MOVEMENT OF DEPENDENT INSTRUCTIONS IN A MICROPROCESSOR

(75) Inventors: Hung Qui Le, Austin, TX (US); Dung Quoc Nguyen, Austin, TX (US); Raymond Cheung Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 11/054,289

(22) Filed: Feb. 9, 2005

(65) Prior Publication Data

US 2006/0179282 A1    Aug. 10, 2006

(51) Int. Cl.
*G06F 9/312* (2006.01)
(52) U.S. Cl. ...................................................... 712/217
(58) Field of Classification Search ................... 712/216, 712/217
See application file for complete search history.

(56) References Cited

U.S. PATENT DOCUMENTS 4,903,196 A * 2/1990 Pomerene et al. ........... 712/217

* cited by examiner

*Primary Examiner*—Robert E Fennema
(74) *Attorney, Agent, or Firm*—Duke W. Yee; Diana L. Roberts, Gerhardt; James O. Skarsten

(57) ABSTRACT

A method and related apparatus is provided for a processor having a number of registers, wherein instructions are sequentially issued to move through a sequence of execution stages, from an initial stage to a final write back stage. As a method, an embodiment includes the step of issuing a first instruction, such as an FMA instruction, to move through the sequence of execution stages, the first instruction being directed to a specified one of the registers. The method further includes issuing a second instruction to move through the execution stages, the second instruction being issued after the first instruction has issued, but before the first instruction reaches the final write back stage. The second instruction is likewise directed to the specified register, and comprises either a store instruction or a load instruction, selectively. R and W bits corresponding to the specified register are used to ensure that a store instruction does not read data from, and that a load instruction does not write data to the specified register, respectively, before the first instruction is moved to the final write back stage.

18 Claims, 2 Drawing Sheets

METHOD USING VECTOR COMPONENT COMPRISING FIRST AND SECOND BITS TO REGULATE MOVEMENT OF DEPENDENT INSTRUCTIONS IN A MICROPROCESSOR

BACKGROUND OF THE INVENTION

1. Technical Field

The invention disclosed and claimed herein generally pertains to a method wherein a Hazard Vector, usefully comprising an R bit and a W bit, is used to enhance throughput of dependent instructions in a microprocessor. More particularly, the invention pertains to a method of the above type wherein an older instruction is issued for execution before the dependent instruction, and the results of the two instructions must be written back in order, that is, the older instruction result must be written back before the dependent instruction result. Even more particularly, the invention pertains to a method of the above type wherein the Hazard Vector bits are used to minimize the time interval between issue of the older instruction for execution and issue of the dependent instruction, while at the same time ensuring that respective instruction results are written back in order.

2. Description of Related Art

In a microprocessor, wherein instructions are sequentially executed, an execution generally concludes by writing back the result of the execution into a register such as a floating point register (FPR). For store instructions, execution concludes by reading data from the register, so that the data can be moved and stored somewhere else. Since the executions occur sequentially in the processor, an instruction may be dependent on an older preceding instruction. This could occur if the older and the dependent instructions are both directed to access the same register. In a dependent relationship, it is very important that the two instructions be written back in order, so that both instructions will be able to access the data they are respectively intended to access. For example, a dependent or younger load instruction, executed to write data into a specified register, cannot be allowed to write to the register before an older store instruction has had a chance to read the register. Otherwise, the store instruction would read data that had been changed from what the store instruction was intended to read.

In order to ensure proper timing in executing the sequential instructions, so that successive instructions will be written back in order, a microprocessor must take into account both write after write (WAW) and read after write (RAW) events. A WAW could occur, for example, between a Floating Point Multiply-Add (FMA) instruction and a younger dependent load instruction, if both instructions had the same destination register. As used herein, FMA refers generically to a mathematical operation such as addition or multiplication. Thus, an FMA instruction produces a numerical or other result that must be written to its destination register. Clearly, the result must be written to the destination before the younger load instruction writes new data to the same destination. A RAW could occur between an FMA instruction and a younger store instruction that were both directed to the same register.

At present, to ensure that sequentially executed instruction are written back in order in a microprocessor, a common approach is to hold a dependent instruction at the issue stage, until the older instruction completes its execution cycle and has thus been written back. However, this approach can lead to a reduction in performance, since no work can be done in regard to the dependent instruction, while it is simply waiting for its execution to begin. Performance could be significantly improved, if a younger dependent instruction could begin execution shortly after the older instruction had begun execution, so that the dependent instruction no longer had to wait until the older instruction completed its execution cycle.

SUMMARY OF THE INVENTION

The invention is generally directed to a procedure wherein a dependent instruction in a microprocessor is allowed to issue, or begin execution, before its preceding older instruction has completed its execution cycle and written back to its destination or source. This procedure thus speeds up WAW between a floating load instruction and an FMA instruction, and also speeds up RAW between an FMA and a dependent floating store instruction. At the same time, a Hazard Vector (Hvec) is provided for use by the Floating Point Issue Queue (FPQ). The Hvec is used to make sure that a dependent load instruction is written back in order, with respect to an older FMA instruction. The Hvec is also used to make sure that a younger load instruction does not write to the register, before an older store instruction has had a chance to read the same register. A useful embodiment of the invention is directed to a processor having a number of registers, wherein instructions are sequentially issued to move through a sequence of execution stages, from an initial stage to a final write back stage. The method includes the step of issuing a first instruction to move through the sequence of execution stages, the first instruction being directed to a specified one of the registers. The method further includes issuing a second instruction to move through at least some of the execution stages, the second instruction being issued after the first instruction has issued, but before the first instruction reaches the final write back stage.

The second instruction is likewise directed to the specified register, and comprises either a store instruction or a load instruction, selectively. First and second bits corresponding to the specified register are used to ensure that a store instruction does not read data from, and a load instruction does not write data to, the specified register, respectively, before the first instruction arrives at the final write back stage.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
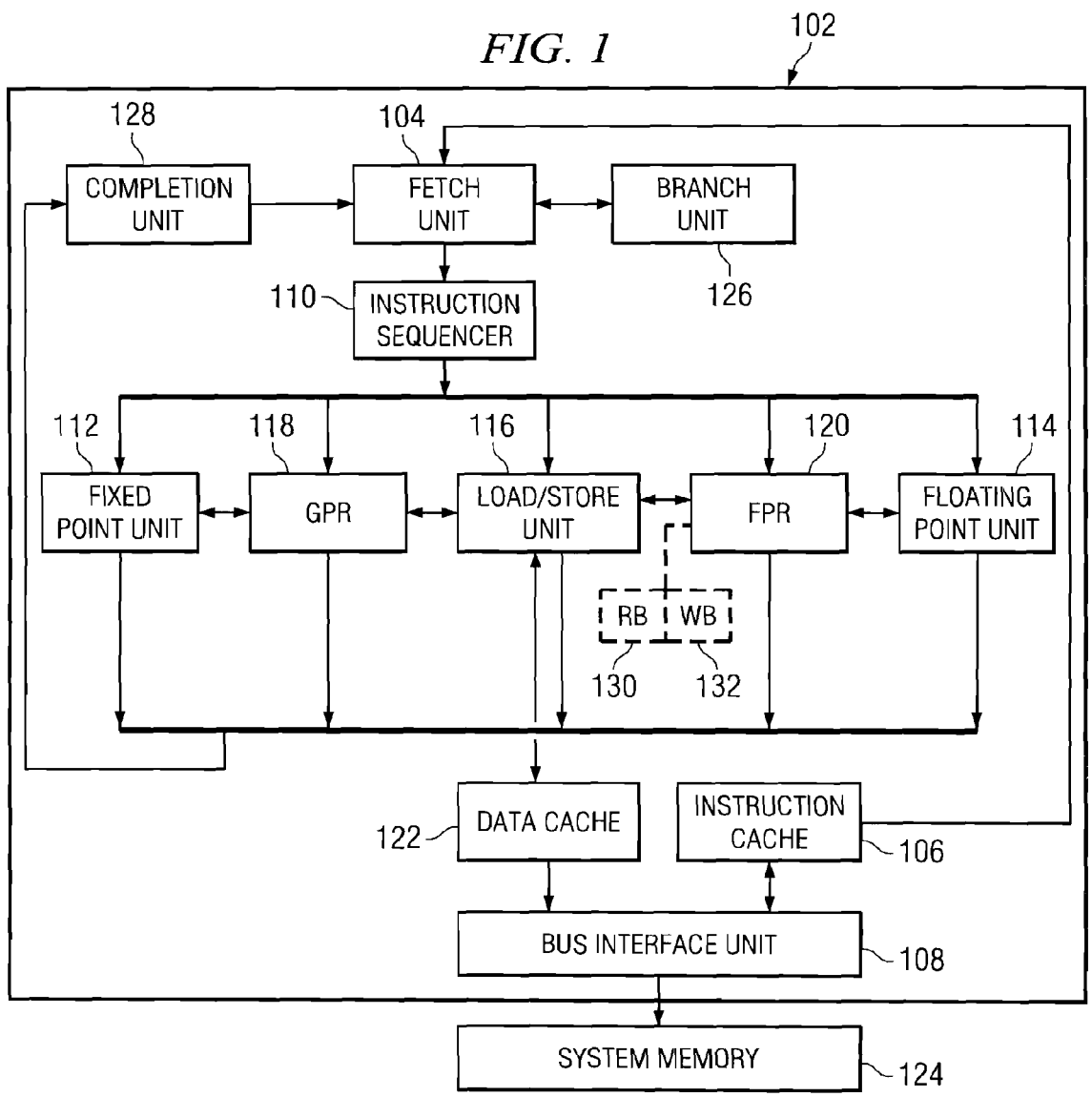
FIG. 1 is a block diagram showing a simplified microprocessor using an embodiment of the invention.

Referring to FIG. 1, there is shown a generalized Central Processing Unit (CPU) or microprocessor 102 for implementing an embodiment of the invention. Processor 102 includes a fetch unit 104 connected to fetch or obtain instructions from an instruction cache 106, which is coupled to exchange instruction related information with a bus interface unit 108. An instruction sequencer 110 is connected to fetch unit 104, to arrange respective received instructions in an instruction issue queue. The issue queue determines the sequence or order in which sequencer 110 issues each instruction to an execution unit corresponding to the instruction. Certain preliminary tasks or operations that must be performed with respect to some of the instructions before they issue, as described hereinafter, are also carried out at the instruction sequencer 110.

Referring further to FIG. 1, there are shown instruction execution units including a fixed point unit 112, a floating point unit 114, and a load/store unit 116. Fixed point unit 112 is generally configured to execute all integer arithmetic, logical operations, shifts, rotates, compares and traps. Floating point unit 114 is a dedicated execution unit designed for performing mathematical functions on floating point numbers, that is, any number other than an integer. Herein, all instructions to be executed by floating point unit 114 are generically referred to as FMA instructions. The load/store unit 116 executes all load instructions and store instructions. A store instruction can be used to cause a data entry in general purpose register (GPR) 118 or floating point register (FPR) 120 to be read, and then moved through data cache 122 to system memory 124. A load instruction can cause a data entry to be loaded into FPR 120, for use in performing an operation required by an FMA instruction executed by floating point unit 116.

FIG. 1 further shows processor 102 provided with a branch unit 126 connected to fetch unit 104, and a completion unit 128 connected between the execution units and fetch unit 104. Units 126 and 128 generally operate in a conventional manner. If branch unit 126 determines that an instruction received by fetch unit 104 is a branch instruction, it will act to replace the branch instruction with instructions located at the branch destination.

Figure 2:
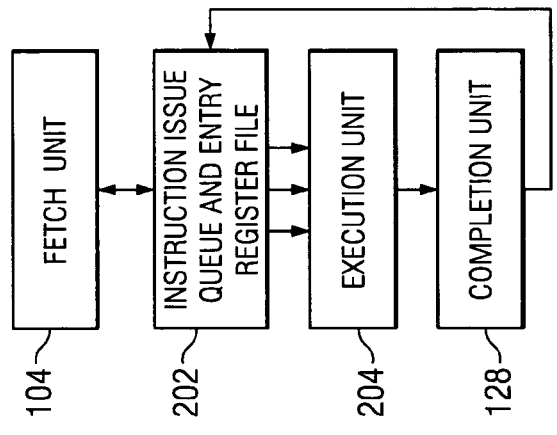
FIG. 2 is a block diagram showing selected components of the microprocessor of FIG. 1.

Referring to FIG. 2, there is shown an instruction issue queue and entry register file 202 associated with instruction sequencer 110 of the microprocessor 102. Instructions are issued by the instruction issue queue and routed to the appropriate execution units 112-116, which are represented generically in FIG. 2 as execution unit 204. In a very useful embodiment of the invention, execution unit 204 in FIG. 2 alternatively comprises floating point unit 114 or the load/store unit 116, and the instruction issue queue includes the FPQ.

The embodiment of the invention is implemented by providing a Hazard Vector (Hvec) comprising 2 bits per register, or an R bit and a W bit. Thus, if the entry register file 202 is a 32 entry register file, it will have 32 R bits and 32 W bits in the Hvec. The R bit of the Hvec is used by the FPQ to enable speed up of the RAW of a floating store instruction that is dependent on an older FMA instruction. The R bit is also used to indicate a store folding condition, as described hereinafter in further detail. The W bit is used to enable speed up of the WAW of a floating load instruction that is dependent on an older FMA. The W bit is also used to ensure that a younger load instruction does not write to a register, before an older store instruction has a chance to read the register.

Referring further to FIG. 1, there is shown an exemplary vector component comprising R bit (RB) 130 and W bit (WB) 132, which each corresponds to FPR 120 and may be used therewith when FPR 120 is serving as the destination register of an instruction. As described above, FPR 120 can be used selectively as a destination register for both store instructions and load instructions.

Figure 3:
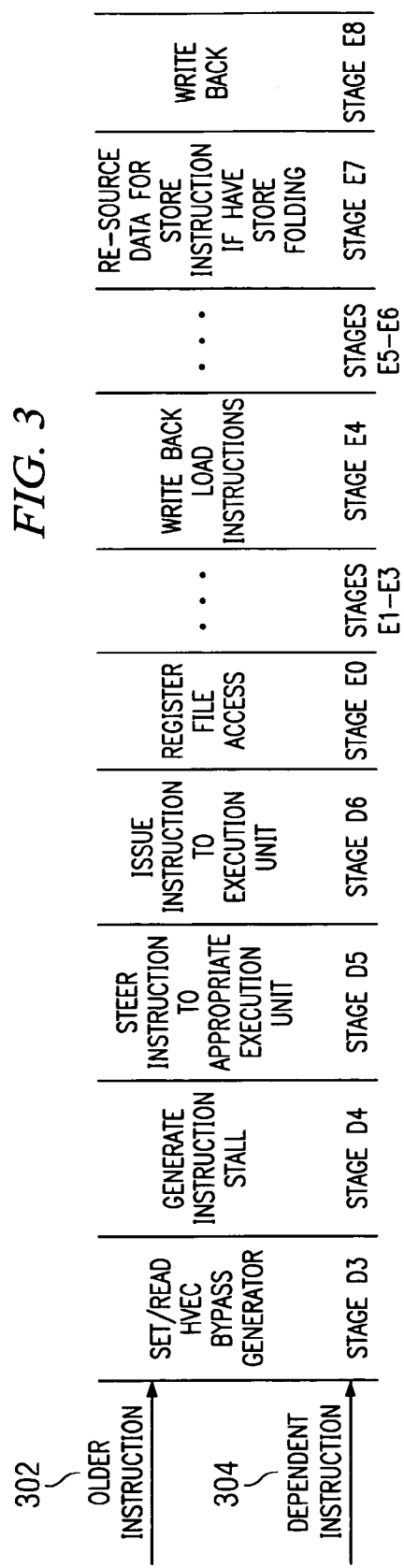
FIG. 3 is a schematic diagram showing a multiple stage pipeline sequence of operations that illustrates operation of the microprocessor of FIG. 1 in implementing an embodiment of the invention.

Processor 102 executes each successive instruction over a sequence of pipeline stages. Referring to FIG. 3, there is shown a diagram illustrating sequential pipeline stages D3-D6 and E0-E8. The stages D3-D6 are preliminary stages, and respective events thereof are directed by instruction sequencer 110. Stages E0-E8 are respective execution stages, and thus take place in the selected execution unit 204. Events occurring in the pipeline stages shown in FIG. 3 are summarized as follows:

D3: Set Hvec/Read Hvec/Bypass Generation
D4: Instruction stall generation
D5: Steer instruction to appropriate execution unit
D6: Issue to execution unit
E0: Register File Access
E1: Execution Stage 1
E2: Execution Stage 2
E3: Execution Stage 3
E4: Execution Stage 4 (WB for loads)
E5: Execution Stage 5
E6: Execution Stage 6
E7: Execution Stage 7 (Re-source data for stores if store-folding)
E8: WB Stage FIG. 3 shows an older instruction 302 directed through stages D3-D6 and E0-E8, and further shows a younger instruction 304. Instruction 304 follows instruction 302 in the instruction sequence, and is directed to write data to or read data from the same register. Thus, the execution of instruction 304 is dependent on instruction 302, in that write back must be carried out by the two instructions in order, as described above. Subject to this constraint, it would be very desirable to minimize the time interval that instruction 304 must wait to begin execution, from the time that older instruction 302 begins execution at stage E0. This minimization of time can be achieved by using the R and W bits of the Hvec described above.

Respective events pertaining to use of one or both of these bits at pipeline stages D3-D4, E0, E2, E4, and E7-E8, in accordance with an embodiment of the invention, is described hereinafter in further detail. These events collectively disclose that use of the R and W bits ensures that instructions with which they are associated will be written back in order. At the same time, dependent store and load instructions are allowed to begin execution only one or a few stages after an older instruction has reached stage E0, the first execution stage.

When an FMA instruction arrives at stage D3, both the R and W bits corresponding to the destination register of the FMA are set. When a store instruction arrives at stage D3, the W bit corresponding to the source register of the store instruction is set, and the R bit corresponding thereto is read. This R bit is then moved through subsequent pipeline stages, along with the store instruction.

When a load instruction arrives at stage D3, the R bit corresponding to the destination register of the load instruction is reset, and the W bit corresponding thereto is read. This W bit is then moved through subsequent pipeline stages along with the load instruction. As indicated above, the W bit would have been set by a preceding FMA or store instruction directed to the same register as the load instruction destination.

Also at stage D3, the source of a store instruction is compared with the destination of any FMA or load instruction then at stages E2, E3, or E4. These stages are six, seven, and eight stages, respectively, ahead of stage D3. If the destination of an instruction at a particular one of these stages is the same as the source of the store instruction at D3, the data at the particular stage will be the same data that the store instruction must read when it reaches its source, and then write back to memory. Accordingly, results of the comparison with stages E2, E3, and E4 are moved through subsequent pipeline stages, along with the store instruction. This information may be used for a data bypass, as described hereinafter.

When the load instruction reaches stage D4, it is stalled or held if its accompanying W bit is set, that is, is equal to 1. This W bit was set at stage D3 by a preceding FMA or store instruction. Accordingly, the load instruction is held at D4 until such preceding instruction reaches stage E2, five stages ahead of D4. This stalling action ensures that the preceding instruction will reach the write back stage E8 before the load instruction executes a write back of its data. While the load instruction is stalled at D4, its destination is compared with the destination of an FMA or the source of a store instruction at stage D2. A match between the load destination and a destination or source at E2 indicates that the preceding instruction has reached E2. Thereupon, the W bit accompanying the load instruction is reset, allowing the load instruction to continue along the pipeline sequence, and thus to issue for execution at stage E0.

When the store instruction reaches stage E0, the comparison information moving along with the store instruction is considered. If the source of the store instruction at D3 matched the destination of the instruction then at E2, such instruction is at E6 when the store instruction reaches E0. Accordingly, the data of the instruction at E6 is bypassed to stage E0, for use with the store instruction. Alternatively, the data is bypassed from E7 or E8, if a match had previously been found at stage E3 or E4, respectively. If none of the instruction destinations matched the store source when the store instruction was at D3, data for the store instruction at E0 is sourced from the file register.

When an FMA instruction reaches stage E2, the W bit corresponding to the FMA destination is reset. Similarly, when a store instruction reaches stage E2, the W bit corresponding to the store source is reset. These actions are taken, since any younger or dependent load instruction has been sufficiently stalled at stage D4 as described above. Thus, an FMA or store instruction at E2 will access its intended register before the data therein can be changed by the load instruction. At stage E2 the R bit corresponding to the destination of an FMA instruction is also reset.

When a load instruction arrives at stage E4, the data associated therewith is written into its destination register. Thus, the load instruction cycle is shortened, by ending the cycle at stage E4 rather then E8. By stalling the load instruction at stage D4 as described above, any older FMA or store instruction will still have reached stage E8 and concluded its cycle, before the load write back occurs at E4.

When a store instruction reaches stage E7, the FPR register file will be re-read, if the accompanying R bit is set, to acquire the source data required for the store instruction. This is referred to as store folding. Thus, with store folding a store instruction does not have to wait at the issue stage until an older FMA has produced its result, even though the store instruction is dependent upon such result for its source data. Instead, the store instruction can issue immediately after the older FMA has issued, and then flow down the execution pipeline. If the store data is available at its issue time (E0 stage), from either a bypass or the FPR register file as described above, then the store instruction is not folded. Otherwise, store folding takes place, and the store sources its data at the last execution stage (E7) before stage E8. Thus, whether or not there is store folding, a dependent store instruction can immediately follow its older instruction down the execution pipeline.

When an FMA instruction arrives at stage E8, the result produced thereby is written back. When a store instruction arrives at stage E8, its store data is sent out to memory.

In the above embodiment of the invention, the Hvec is reset in E2. However, in other designs where the pipeline length is different, the Hvec reset will usefully occur in a different stage. If the pipeline length is longer, the Hvec reset will occur later and if the pipeline is shorter, the Hvec reset will occur earlier.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a processor having a number of registers, wherein instructions are sequentially issued to move through a sequence of execution stages from an initial stage to a final write back stage, a method comprising the steps of:
    issuing a first instruction to move through said sequence of execution stages, said first instruction being directed to a specified one of said registers;
    issuing a second instruction to move through at least some of said execution stages, said second instruction being issued after said first instruction has issued, but before said first instruction reaches said final write back stage, said second instruction being likewise directed to said specified register and comprising either a store instruction or a load instruction, selectively;
    providing a vector component that is limited to a single R bit and a single W bit that respectively correspond to said specified register;
    using only said R bit of said vector component to ensure that said second instruction does not read data from said specified register before said first instruction reaches said final write back stage, when said second instruction comprises a store instruction; and
    using only said W bit of said vector component to ensure that said second instruction does not write data to said specified register before said first instruction reaches said final write back stage, when said second instruction comprises a load instruction.

2. The method of claim 1, wherein:
    said execution stages are preceded by one or more preliminary stages, wherein all of said stages collectively comprise the stages of a pipeline sequence.

3. The method of claim 2, wherein:

said second instruction comprises a store instruction, wherein said store instruction is configured to read said specified register at said initial execution stage in order to source data, and to re-read said specified register, only if said R bit is in a set condition, at the execution stage immediately preceding said final write back stage.

4. The method of claim 2, wherein:

said first instruction sets said W bit at one of said preliminary stages, said first instruction comprising either a Floating Point Multiply—Add (FMA) instruction or a store instruction, selectively; and said second instruction comprises a load instruction that reads said W bit at said one of said preliminary stages, so that said W bit moves through said pipeline sequence with said load instruction.

5. The method of claim 2, wherein:

said second instruction comprises a load instruction, wherein said load instruction is selectively stalled at a particular one of said preliminary stages when said W bit is in a set condition.

6. The method of claim 2, wherein:

said first instruction comprises either an FMA instruction or a load instruction, selectively, said first instruction setting said R bit at one of said preliminary stages, when said first instruction comprises an FMA instruction, and said first instruction resetting said R bit at one of said preliminary stages, when said first instruction comprises a load instruction; and said second instruction comprises a store instruction that reads said R bit at said one of said preliminary stages, and said R bit moves through said pipeline sequence with said store instruction.

7. The method of claim 5, wherein:

data associated with said load instruction is written into said specified register when said load instruction arrives at a stage along said sequence of execution stages that is a prespecified number of stages before said final write back stage.

8. The method of claim 5, wherein:

when said load instruction is stalled at said particular preliminary stage, said W bit is reset upon confirming that said first instruction is at least a prespecified number of said pipeline stages ahead of said particular preliminary stage, whereupon said load instruction is enabled to move further along said pipeline sequence.

9. In a processor having a number of registers, wherein instructions are sequentially issued to move through a sequence of execution stages from an initial stage to a final write back stage, an apparatus comprising:

a sequencing device for preparing a first instruction and a second instruction to move through said sequence of execution stages, said first and second instructions both being directed to a specified one of said registers, said second instruction comprising either a store instruction or a load instruction, selectively;

one or more execution units for moving said first and second instructions through respective execution stages, said second instruction being issued after said first instruction has issued, but before said first instruction reaches said final write back stage;

means for implementing a vector component that is limited to a single R bit and a single W bit that respectively correspond to said specified register;

means for using only said R bit of said vector component to ensure that said second instruction does not read data from said specified register before said first instruction reaches said final write back stage, when said second instruction comprises a store instruction; and means for using only said W bit of said vector component to ensure that said second instruction does not write data to said specified register before said first instruction reaches said final write back stage, when said second instruction comprises a load instruction.

10. The apparatus of claim 9, wherein:

said second instruction comprises a store instruction configured to read said specified register at said initial execution stage in order to source data, and to re-read said specified register, if said R bit is in a set condition, at the execution stage immediately preceding said final write back stage.

11. The apparatus of claim 10, wherein:

said store instruction is issued to move through said sequence of execution stages when said first instruction has moved from said initial stage to the stage immediately following said initial stage in said execution sequence.

12. The apparatus of claim 9, wherein:

said execution stages are preceded by one or more preliminary stages, all of said stages collectively comprising the stages of a pipeline sequence;

said second instruction comprises a load instruction, said load instruction being selectively stalled at a particular one of said preliminary stages when said W bit is in a set condition; and said W bit is reset upon confirming that said first instruction is at least a prespecified number of said pipeline stages ahead of said particular preliminary stage, whereupon said load instruction is enabled to move further along said pipeline sequence.

13. The apparatus of claim 12, wherein:

data associated with said load instruction is written into said specified register when said load instruction arrives at a stage along said sequence of execution stages that is a prespecified number of stages before said final write back stage.

14. In a computer processing system having a number of registers, wherein instructions are sequentially issued to move through a sequence of execution stages from an initial stage to a final write back stage, a computer program product executable in a computer readable storage medium comprising:

a first set of program instructions for issuing a first instruction to move through said sequence of execution stages, said first instruction being directed to a specified one of said registers;

a second set of program instructions for issuing a second instruction to move through at least some of said execution stages, said second instruction being issued after said first instruction has issued, but before said first instruction reaches said final write back stage, said second instruction being likewise directed to said specified register and comprising either a store instruction or a load instruction, selectively;

a third set of program instructions for implementing a vector component that is limited to a single R bit and a single W bit that respectively correspond to said specified register;

a fourth set of program instructions for using only said R bit of said vector component to ensure that said second instruction does not read data from said specified register before said first instruction reaches said final write back stage, when said second instruction comprises a store instruction; and a fifth set of program instructions for using only said W bit of said vector component to ensure that said second instruction does not write data to said specified register before said first instruction reaches said final write back stage, when said second instruction comprises a load instruction.

15. The computer program product of claim 14, wherein:
said second instruction comprises a store instruction configured to read said specified register at said initial execution stage in order to source data, and to re-read said specified register, if said R bit is in a set condition, at the execution stage immediately preceding said final write back stage.

16. The computer program product of claim 15, wherein:
said store instruction is issued to move through said sequence of execution stages when said first instruction has moved from said initial stage to the stage immediately following said initial stage in said execution sequence.

17. The computer program product of claim 14, wherein:
said execution stages are preceded by one or more preliminary stages, all of said stages collectively comprising the stages of a pipeline sequence;

said second instruction comprises a load instruction, said load instruction being selectively stalled at a particular one of said preliminary stages when said W bit is in a set condition; and said W bit is reset upon confirming that said first instruction is at least a prespecified number of said pipeline stages ahead of said particular preliminary stage, whereupon said load instruction is enabled to move further along said pipeline sequence.

18. The computer program product of claim 12, wherein:
data associated with said load instruction is written into said specified register when said load instruction arrives at a stage along said sequence of execution stages that is a prespecified number of stages before said final write back stage.

* * * * *